(12) United States Patent
Simcik (10) Patent No.: US 10,723,585 B2
(45) Date of Patent: Jul. 28, 2020

(54) ADAPTIVE SPLIT GROUP ELEVATOR OPERATION

(71) Applicant: Otis Elevator Company, Farmington, CT (US)

(72) Inventor: Paul A. Simcik, Southington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 408 days.

(21) Appl. No.: 15/691,373

(22) Filed: Aug. 30, 2017

(65) Prior Publication Data

US 2019/0062102 A1   Feb. 28, 2019

(51) Int. Cl.
| | | |
|---|---|---|
| *B66B 1/24* | (2006.01) | |
| *B66B 5/00* | (2006.01) | |
| *B66B 1/46* | (2006.01) | |

(52) U.S. Cl.
CPC ............ *B66B 1/2458* (2013.01); *B66B 1/468* (2013.01); *B66B 5/0012* (2013.01); *B66B 2201/20* (2013.01); *B66B 2201/403* (2013.01)

(58) Field of Classification Search
CPC .............. B66B 1/468; B66B 2201/222; B66B 2201/103; B66B 3/006; B66B 5/0012; B66B 5/0006; B66B 5/0018; B66B 2201/4669; B66B 1/52; B66B 2201/4607
See application file for complete search history.

(56) References Cited

U.S. PATENT DOCUMENTS

| | | |
|---|---|---|
| 2,688,383 A | 9/1954 | Eames |
| 4,804,069 A | 2/1989 | Bittar et al. |
| 4,846,311 A | 7/1989 | Thangavelu |
| 4,895,223 A | 1/1990 | Ekholm et al. |
| 4,947,965 A | 8/1990 | Kuzunuki |
| 5,035,302 A | 7/1991 | Thangavelu |
| 5,168,133 A | 12/1992 | Bahjat et al. |

(Continued)

FOREIGN PATENT DOCUMENTS

| | | |
|---|---|---|
| CN | 1085611 C | 5/2002 |
| EP | 0572229 A1 | 12/1993 |

(Continued)

OTHER PUBLICATIONS

A TP So et al., "Intelligent supervisory control for lifts: dynamic zoning," Building Services Engineering Research and Technology, 2001, vol. 22, Issue 1, pp. 14-33.

(Continued)

*Primary Examiner* — Marlon T Fletcher
(74) *Attorney, Agent, or Firm* — Cantor Colburn LLP (57) ABSTRACT

Embodiments herein relate to an elevator system of a facility with multiple floors. The elevator system can comprise elevator cars and an elevator controller. The elevator controller includes a memory and a processor. The memory stores computer program instructions executable by the processor to cause the elevator system to determine a current utilization of the elevator system, automatically activate an adaptive split group operation on a per floor basis when the current utilization of the elevator system is greater than a threshold utilization of the elevator system, and dispatch the elevator cars under the adaptive split group operation in accordance with elevator calls.

18 Claims, 4 Drawing Sheets

(56) References Cited

U.S. PATENT DOCUMENTS

| | | | | |
|---|---|---|---|---|
| 5,168,135 | A | * | 12/1992 | Kubo ................... B66B 1/20 187/382 |
| 5,290,976 | A | | 3/1994 | Bahjat et al. |
| 5,511,635 | A | * | 4/1996 | Kameli ............... B66B 1/2408 187/383 |
| 5,663,538 | A | * | 9/1997 | Sakita ................ B66B 1/2466 187/249 |
| 5,808,247 | A | * | 9/1998 | Thangavelu .......... B66B 1/2458 187/382 |
| 6,000,504 | A | * | 12/1999 | Koh ..................... B66B 1/20 187/382 |
| 6,619,436 | B1 | * | 9/2003 | Hikita ................. B66B 1/2458 187/247 |
| 7,921,968 | B2 | * | 4/2011 | Stanley ................ B66B 1/20 187/383 |
| 9,481,547 | B2 | * | 11/2016 | Flynn ................. B66B 1/2458 |
| 2007/0221454 | A1 | * | 9/2007 | Nikovski .............. B66B 1/18 187/382 |
| 2007/0221455 | A1 | * | 9/2007 | Nikovski .............. B66B 1/18 187/384 |
| 2008/0245618 | A1 | * | 10/2008 | Stanley ................ B66B 1/20 187/383 |
| 2009/0133968 | A1 | * | 5/2009 | Smith ................. B66B 1/2458 187/382 |
| 2013/0168190 | A1 | * | 7/2013 | Christy ............... B66B 1/2408 187/247 |
| 2014/0124302 | A1 | * | 5/2014 | Sorsa ................. B66B 1/2408 187/382 |
| 2015/0203327 | A1 | * | 7/2015 | Appana, Jr. .......... B66B 1/2458 187/383 |
| 2016/0090269 | A1 | * | 3/2016 | Suihkonen ........... B66B 1/2458 187/387 |
| 2016/0167920 | A1 | * | 6/2016 | Freeman .............. B66B 1/2458 187/384 |
| 2019/0062102 | A1 | * | 2/2019 | Simcik ................ B66B 1/2458 |
| 2019/0389689 | A1 | * | 12/2019 | Jia ..................... B66B 1/28 |
| 2020/0031611 | A1 | * | 1/2020 | Mahoney ............. B66B 1/2408 |
| 2020/0031612 | A1 | * | 1/2020 | Akkina ................ B66B 1/468 |

FOREIGN PATENT DOCUMENTS

| | | |
|---|---|---|
| GB | 2129971 A | 5/1984 |
| GB | 2313453 A | 11/1997 |

OTHER PUBLICATIONS

European Search Report for application 18190485.5, dated Jan. 31, 2019, 11 pages.

"MCE: iControl Elevator Controls: Prepared in accordance with Construction Specifications Institute (CSI) 14210," Motion Control Engineering—Specification Guide: Architects and Consultants, 2001, 18 pages, obtained from: http://journals.sagepub.com/doi/abs/10.1191/014362401701524091.

Siikonen, Marja-Liisa, "Elevator Group Control with Artificial Intelligence," Helsinki University of Technology Systems Analysis Laboratory Research Reports, Oct. 1997, 32 pages, obtained from: http://sal.aalto.fi/publications/pdf-files/rsii97a.pdf.

* cited by examiner

ADAPTIVE SPLIT GROUP ELEVATOR OPERATION

BACKGROUND

Contemporary elevator systems can include a plurality of elevators and multiple distinct elevator call panels (e.g., comprising up and down call buttons) on each floor of a facility. Under a normal operation, pressing any call button (e.g., a down call button) of the multiple distinct elevator call panels on any floor causes all corresponding call buttons (e.g., all down call buttons) of all elevator call panels on that floor to light up. In response to pressing the call button, the typical elevator system dispatches one of the plurality of elevators to a floor corresponding to the illuminated elevator call panels.

Further, typical elevator systems can also provide a split operation to alleviate high elevator service demand. Split operation is a mode that allows a facility staff member, usually by using a physical key switch, to divide the plurality of elevators into two elevator groups that are independently operational, such that more than one elevator can be sent to a floor to alleviate the high elevator service demand.

BRIEF DESCRIPTION

In accordance with one or more embodiments, an elevator system of a facility with multiple floors is provided. The elevator system comprises a plurality of elevator cars; and an elevator controller comprising a memory and a processor, the memory storing computer program instructions executable by the processor to cause the elevator system to: determining a current utilization of the elevator system, automatically activating an adaptive split group operation on a per floor basis when the current utilization of the elevator system is greater than a threshold utilization of the elevator system, and dispatching the plurality of elevator cars under the adaptive split group operation in accordance with one or more elevator calls.

In accordance with one or more embodiments or the elevator system embodiment above, the elevator system can assign each of plurality of elevator cars to two or more groups in response to the automatic activation of the adaptive split group operation.

In accordance with one or more embodiments or any of the elevator system embodiments above, the adaptive split group operation being activated on the per floor basis can comprise determining a high traffic floor of a plurality of floors based on the current utilization of the elevator system for the high traffic floor being greater than the threshold utilization while maintaining a remaining set of the plurality of floors under a full group operation.

In accordance with one or more embodiments or any of the elevator system embodiments above, the elevator system can automatically deactivate the adaptive split group operation when the current utilization of the elevator system is equal to or less than the threshold utilization of the elevator system.

In accordance with one or more embodiments or any of the elevator system embodiments above, one or more sensors can be associated with the elevator system automatically to provide an input set utilized to determine the current utilization or the threshold utilization.

In accordance with one or more embodiments or any of the elevator system embodiments above, the current utilization of the elevator system can be determined by the elevator controller based on a number of hall calls from a same floor of the multiple floors, a number of passengers waiting to board the plurality of elevator cars, a number of trips between two floors of the multiple floors, or a load of one or more of the plurality of elevator cars per trip.

In accordance with one or more embodiments or any of the elevator system embodiments above, the threshold utilization of the elevator system can be determined by the elevator controller over a time period based on a total number of hall calls, a total number of passengers of the plurality of elevator cars, or an average load of one or more of the plurality of elevator cars per trip.

In accordance with one or more embodiments or any of the elevator system embodiments above, the elevator system can comprise a plurality of elevator control panels, and at least two of the plurality of elevator control panels can be located on each of the multiple floors.

In accordance with one or more embodiments or any of the elevator system embodiments above, at least two elevator panels can be split into at least two groups that correspond to at least two groups of the plurality of elevator cars.

In accordance with one or more embodiments or any of the elevator system embodiments above, the plurality of elevator cars can be split into at least two groups upon deactivation of the adaptive split group operation.

In accordance with one or more embodiments, a computer-implemented method executable by an elevator controller for operating a plurality of elevators of an elevator system of a facility with multiple floors is provided. The computer-implemented method comprises: determining a current utilization of the elevator system, automatically activating an adaptive split group operation on a per floor basis when the current utilization of the elevator system is greater than a threshold utilization of the elevator system, and dispatching the plurality of elevator cars under the adaptive split group operation in accordance with one or more elevator calls.

In accordance with one or more embodiments or the elevator system embodiment above, the elevator system can assign each of plurality of elevator cars to two or more groups in response to the automatic activation of the adaptive split group operation.

In accordance with one or more embodiments or any of the elevator system embodiments above, the adaptive split group operation being activated on the per floor basis can comprise determining a high traffic floor of a plurality of floors based on the current utilization of the elevator system for the high traffic floor being greater than the threshold utilization while maintaining a remaining set of the plurality of floors under a full group operation.

In accordance with one or more embodiments or any of the elevator system embodiments above, the elevator system can automatically deactivate the adaptive split group operation when the current utilization of the elevator system is equal to or less than the threshold utilization of the elevator system.

In accordance with one or more embodiments or any of the elevator system embodiments above, one or more sensors can be associated with the elevator system automatically to provide an input set utilized to determine the current utilization or the threshold utilization.

In accordance with one or more embodiments or any of the elevator system embodiments above, the current utilization of the elevator system can be determined by the elevator controller based on a number of hall calls from a same floor of the multiple floors, a number of passengers waiting to board the plurality of elevator cars, a number of trips between two floors of the multiple floors, or a load of one or more of the plurality of elevator cars per trip.

In accordance with one or more embodiments or any of the elevator system embodiments above, the threshold utilization of the elevator system can be determined by the elevator controller over a time period based on a total number of hall calls, a total number of passengers of the plurality of elevator cars, or an average load of one or more of the plurality of elevator cars per trip.

In accordance with one or more embodiments or any of the elevator system embodiments above, the elevator system can comprise a plurality of elevator control panels, and at least two of the plurality of elevator control panels can be located on each of the multiple floors.

19. In accordance with one or more embodiments or any of the elevator system embodiments above, the at least two elevator panels can be split into at least two groups that correspond to at least two groups of the plurality of elevator cars.

In accordance with one or more embodiments or any of the elevator system embodiments above, the plurality of elevator cars can be split into at least two groups upon deactivation of the adaptive split group operation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As indicated herein, typical elevator systems can also provide a split operation. The split operation is a mode that allows a facility staff member, usually by using a physical key switch, to divide the plurality of elevator cars into two or more elevator groups that are independently operational. A number of elevator groups can correspond to a number of distinct elevator call panels per floor. For example, if each floor of a facility comprises two distinct elevator call panels (e.g., first and second panels), then the plurality of elevator cars can be divided into two elevator groups (e.g., first and second elevator groups) where a first panel on each floor controls a first elevator group and a second panel on each floor controls a second elevator group.

Under the split operation, pressing a call button of the first panel on any floor causes only the pressed call button to light up and causes the elevator system to dispatch an elevator of the first elevator group to a floor corresponding to the illuminated first panel (e.g., note that the second panel of that same floor is unaffected). Independently, a call button of the second panel on the same floor can be pressed, which causes its illumination and the contemporary elevator system to dispatch an elevator of the second elevator group to the same floor. Thus, the typical elevator systems under the split operation can more effectively address high demand situations (e.g., when there is an above average number of passengers needing elevator transportation) by sending two elevator cars to the same floor than the typical elevator systems under the normal operation.

The problem with the typical elevator system is that passengers learn during the high demand situations that pressing both panels calls two elevator cars. In turn, single passengers are observed pressing both call buttons outside of the high demand situations on both elevator panels in an attempt to accelerate an arrival of an elevator (e.g., instead of making one elevator call). This change in passenger conduct commandeers the resources and reduces the efficiency of the elevator systems. Further, manually changing between normal and split operations by a facility staff member based on anticipated or predicted high demand situations has been found to be a burden on the automatic operations of the elevator systems, as facility staff member forget to manually operate and/or untimely operate the physical key switch.

Figure 1A:
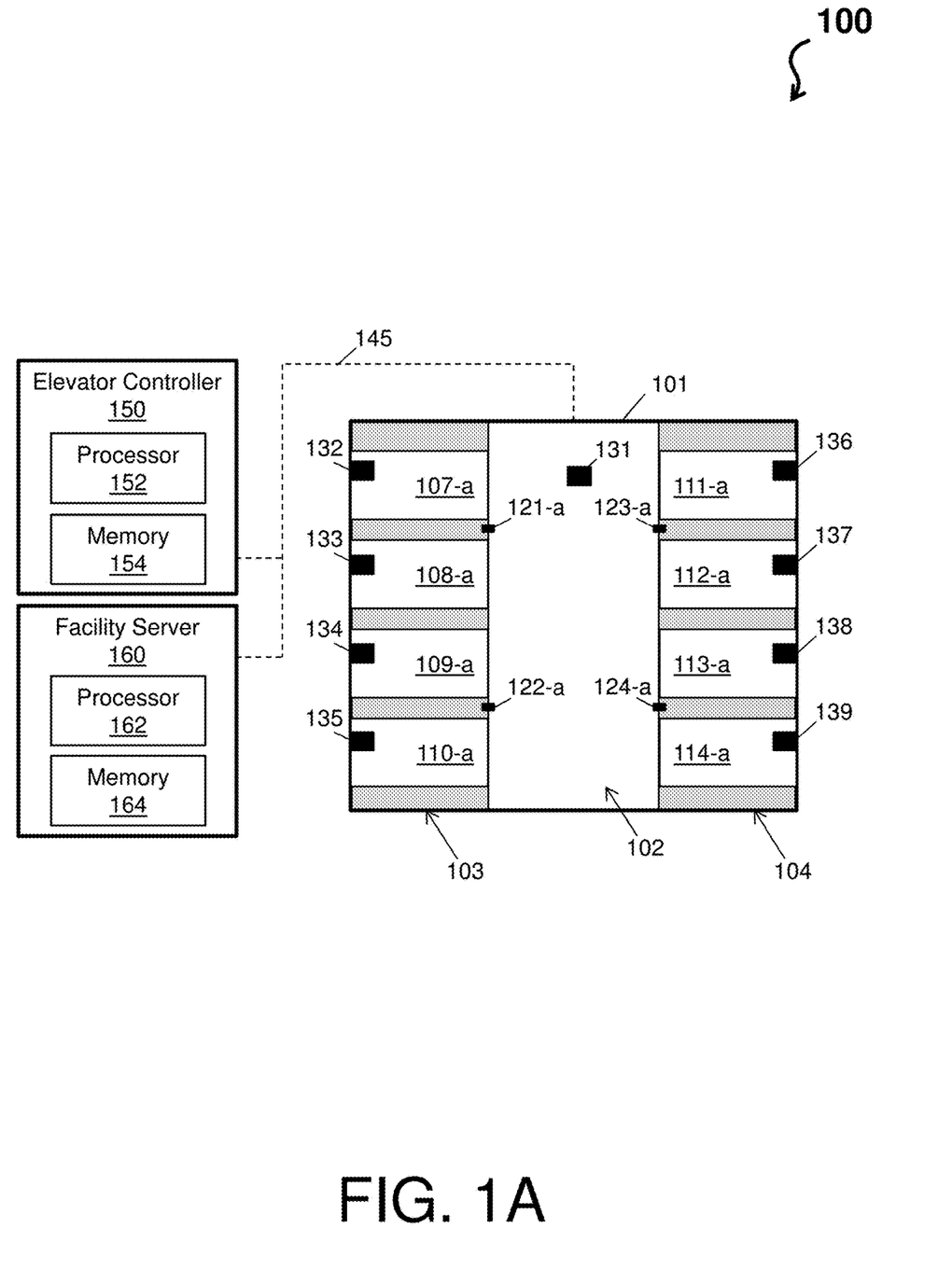
FIG. 1A depicts an elevator system in accordance with one or more embodiments.
Figure 1B:
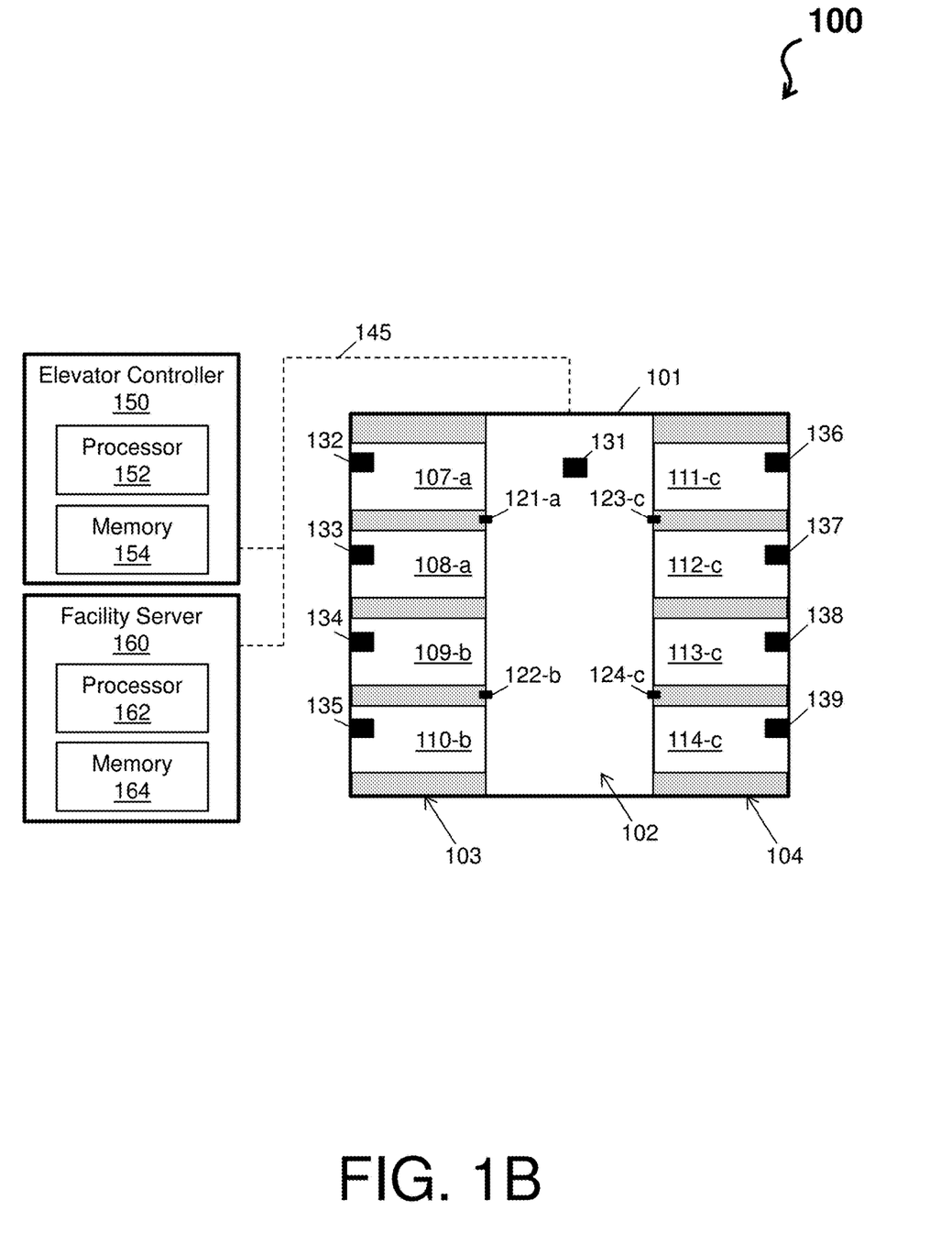
FIG. 1B depicts an elevator system in accordance with one or more embodiments.

In view of and in contrast to the typical elevator systems, embodiments disclosed herein may include an elevator system, method, and/or computer program product (herein elevator system) that monitors current utilization of elevator cars in group and automatically activates a full group operation or an adaptive split group operation. FIGS. 1A and 1B depict an elevator system 100 in accordance with one or more embodiments.

As shown in FIG. 1A, the elevator system 100 comprises a facility 101. The facility is represented under a full group operation. Examples of the facility 101 include buildings with multiple floors, high-rise buildings, sky scrapers, boats, cruise ships, parking garages, etc. The facility 101 comprises a lobby 102 from which passengers can access elevator banks 103 and 104. Each elevator bank 103 and 104 can comprise one or more elevator cars 107, 108, 109, 110, 111, 112, 113, and 114. The lobby 102 can further comprise one or more elevator call panels 121, 122, 123, and 124. Under the full group operation, each elevator 107, 108, 109, 110, 111, 112, 113, and 114 and each elevator call panel 121, 122, 123, and 124 can be assigned to group 'a' (e.g., elevator 107-a, 108-a, 109-a, 110-a, 111-a, 112-a, 113-a, and 114-a and elevator call panel 121-a, 122-a, 123-a, and 124-a), as shown in FIG. 1A. In this regard, any one of the elevator cars 107, 108, 109, 110, 111, 112, 113, and 114 from group 'a' can be called by a passenger standing in the lobby 102 by utilizing one or more elevator call panels 121, 122, 123, and 124 assigned to group 'a.'

Distributed throughout the facility 101 are sensors 131, 132, 133, 134, 135, 136, 137, and 138. The sensors can be electro-mechanical components that detect events or changes in an environment of the elevator system 100 (or corresponding components therein) and outputs the events or changes as sensor signals 145 to other components of the elevator system 100.

In accordance with one or more embodiments, the sensor 131 of the lobby 102 can detect events or changes regarding an environment of the facility 101. For example, the sensor 131 of the lobby 102 can be a video sensor, infrared sensor, depth sensor, motion sensor, floor mounted pressure sensor, or any other known sensor that detects a number of passengers in the lobby 102, an amount of time each passenger has been in the lobby 102, etc.

In accordance with one or more embodiments, the sensors 132, 133, 134, 135, 136, 137, and 138 of the elevator cars 107, 108, 109, 110, 111, 112, 113, and 114, respectively, can detect events or changes regarding an environment within the elevator cars 107, 108, 109, 110, 111, 112, 113, and 114, such as a number of passengers in the elevator cars 107, 108, 109, 110, 111, 112, 113, and 114, a weight or load in the elevator cars 107, 108, 109, 110, 111, 112, 113, and 114, etc. For example, the sensor 132 of the elevator car 107 can be a strain gain that detects an elevator load. In one embodiment, the sensor 132, 133, 134, 135, 136, 137, and 138 of the elevator cars 107, 108, 109, 110, 111, 112, 113, and 114 can be an video sensor, infrared sensor, depth sensor, motion sensor, floor mounted pressure sensor, or any other known sensor that detects a number of passengers in the lobby The elevator system 100 comprises an elevator controller 150, which includes a processor 152 and a memory 154. In general, the elevator controller 150 serves to operate and control positions, speeds, destinations, door operations, etc. of the elevator cars 107 and the elevator banks 103. The facility server 160, which comprises a processor 162 and a memory 164, serves to store data of the elevator system 100 to support the operations therein. The data can be information derived from the sensor signals from the sensors 131, 132, 133, 134, 135, 136, 137, 138, and 139, derived from operations of the elevator cars 107, 108, 109, 110, 111, 112, 113, and 114, derived operations of the one or more elevator call panels 121, 122, 123, and 124, derived from statuses of the elevator banks 103 and 104, derived from operations of the elevator controller 150, derived from building schedules stored on the facility server 160, etc.

The elevator controller 150 and the facility server 160 can be any computing device comprising hardware and/or software for carrying out operations of the elevator system 100. Note that each item of FIG. 1A can be representative of one or more of that item such that, for example, the elevator controller 150 can comprise one or more processors 152112, one or more memories 154114, etc. or that more than one elevator controller 150 may be employed. FIG. 1A can be representative of one or more of that item such that, for example, the facility server 160 can comprise one or more processors 162, one or more memories 164, etc. or that more than one facility server 160 may be employed. The elevator controller 150 and the facility server 160 may be local to the building or may be located remotely in the cloud or at a remotely connected computing device.

The processors 152 and 162 (also referred to as a processing circuit) can be coupled via a system bus to the memories 154 and 164, respectively, and various other components. The memories 154 and 164 can include a read only memory (ROM) and a random access memory (RAM). The ROM is coupled to the system bus and may include a basic input/output system (BIOS), which controls certain basic functions of the processors 152 and 154 or the elevator system 100. The RAM is read-write memory coupled to the system bus for use by the processors 152 and 162.

Software for execution by the elevator system 100 may be stored in the memories 154 and 164 (e.g., the memories 154 and 164 can store full group operation code and adaptive split group operation code). The memories 154 and 164 are examples of a tangible storage medium readable by the processor 152 and 162, respectively, where the software is stored as instructions for execution by the processor 152 and 162, respectively to cause the elevator system 100 to operate, such as is described herein with reference to FIGS. 2-3. Examples of computer program product and the execution of such instruction is discussed herein in more detail.

Turning now to FIG. 1B, an example of the facility under an adaptive split group operation is shown. Items of FIG. 1B that similar to items of FIG. 1A are not reintroduced for ease of explanations. As depicted, FIG. 1B includes additional groups 'b' and 'c.' That is, the elevator cars 107 and 108 and the elevator call panel 121 are assigned to group 'a' (e.g., shown as the elevator cars 107-a and 108-a and the elevator call panel 121-a); the elevator cars 109 and 110 and the elevator call panel 122 are assigned to group 'b' (e.g., shown as the elevator cars 109-b and 110-b and the elevator call panel 122-b); and the elevator cars 111, 112, 113, and 114 and the elevator call panels 123 and 124 are assigned to group 'c' (e.g., shown as the elevator cars 111-c, 112-c, 113-c, and 114-c and the elevator call panels 123-c and 124-c).

In accordance with one or more embodiments, the adaptive split group can be feature that is activated/deactivated on a per-floor basis. In this way, passengers who press hall buttons at some floors can receive the full group operation (e.g., the elevator system 100 assigns one elevator from all elevators in the group), while passengers who press hall buttons at other floors that are designated as 'high traffic' floors can receive the adaptive split group operation (e.g., the elevator system 100 separates at least one hall buttons to request a subset of all the elevators). Once a corresponding elevator arrives, the passengers are able to go to any valid floor available in the building regardless of the full group or the adaptive split group operations of their originating floor.

Figure 2:
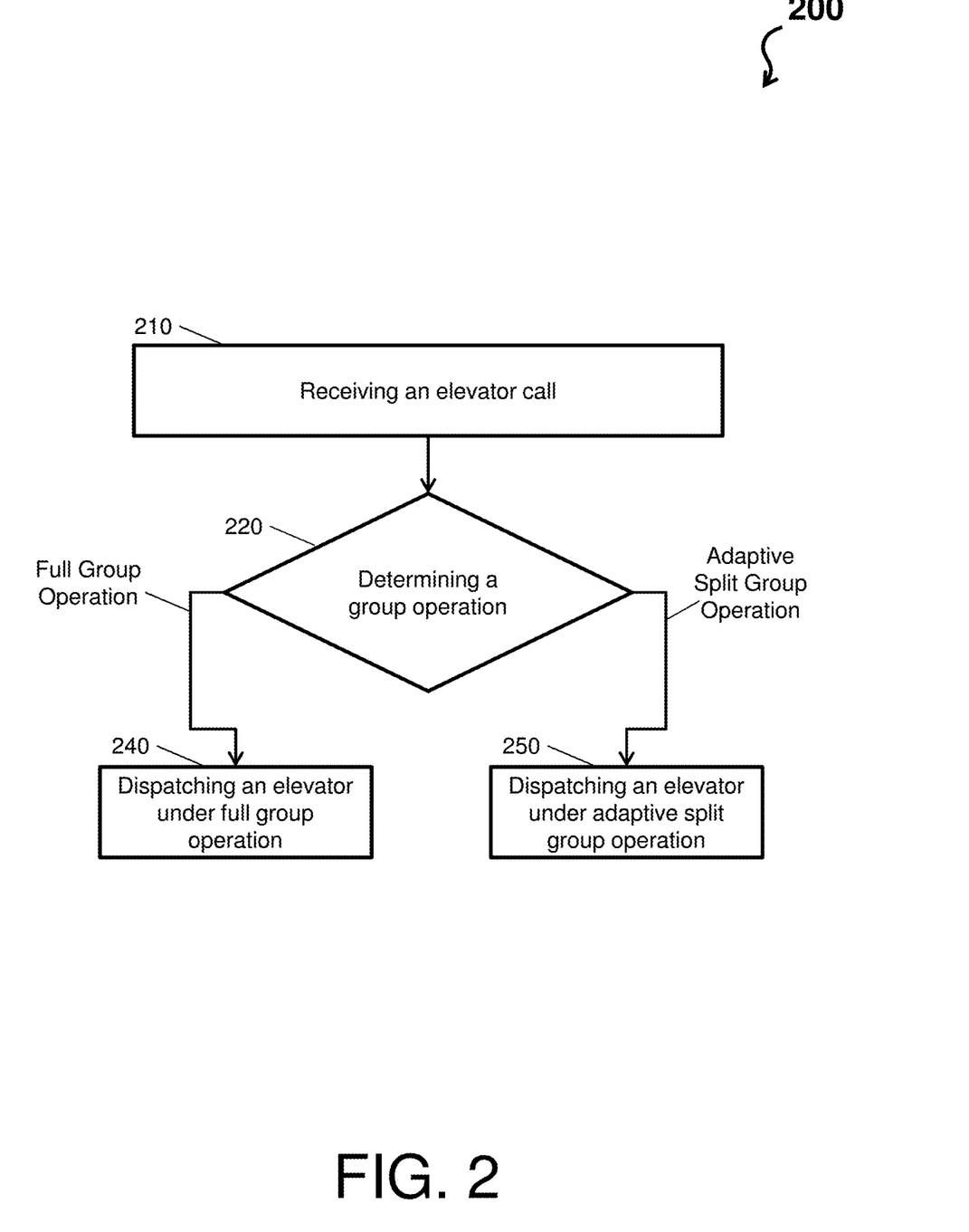
FIG. 2 depicts a process flow of an elevator system in accordance with one or more embodiments.

Turning now to FIG. 2, operations of the elevator system 100 are described with respect to the full group operation shown in FIG. 1A and the adaptive split group operation shown as in FIG. 1B, in accordance with one or more embodiments. FIG. 2 depicts a process flow 200 where the elevator controller 150 monitors current utilization of the elevator cars 107, 108, 109, 110, 111, 112, 113, and 114 per group and automatically activates the full group operation or the adaptive split group operation.

The process flow 200 begins at block 210, where the elevator system 100 receives an elevator call. The elevator call can be received from any of the one or more elevator call panels 121, 122, 123, and 124, which can be referred to as a hall call. The elevator call can also be received from a kiosk, a mobile phone, etc. The elevator call is used by the elevator system 100 (i.e., the elevator controller 150) to determine on which floor a passenger is located and which elevator to dispatch.

At decision block 220, the elevator system 100 determines a group operation. If the elevator system 100 determines that a full group operation is presently active, then the process flow 200 proceeds to block 240 (via the Full Group Operation Arrow). If the elevator system 100 determines that an adaptive split group operation is presently active, then the process flow 200 proceeds to block 240 (via the Adaptive Split Group Operation Arrow).

At block 240, the elevator system 100 dispatches an elevator under full group operation. Returning to the full group operation shown via FIG. 1A, each of the elevator cars 107, 108, 109, 110, 111, 112, 113, and 114 and the elevator control panels 121, 122, 123, and 124 are assigned to group 'a' (e.g., 121-a, 122-a, 123-a, and 124-a). In this regard, when a passenger presses any call button of the multiple elevator control panels 121, 122, 123, and 124, each similar call button on the remaining ones elevator call panels 121, 122, 123, and 124 on light up to indicate that an arrival of an elevator 107 is pending. Further, the elevator controller 150 receives the hall call from the pressed call button and dispatches one of the elevator cars 107, 108, 109, 110, 111, 112, 113, and 114 to pick up the passenger.

At block 250, the elevator system 100 dispatches an elevator under adaptive split group operation. Returning to the adaptive split group operation shown via FIG. 1B, each of the elevator cars 10 are assigned to a group by the elevator system 100. For example, the elevator cars 107-*a* and 108-*a* and the elevator call panel 121-*a* are assigned to group 'a'; the elevator cars 109-*b* and 110-*b* and the elevator call panel 122-*b* are assigned to group 'b'; and the elevator cars 111-*c*, 112-*c*, 113-*c*, and 114-*c* and the elevator call panels 123-*c* and 124-*c* are assigned to group 'c'. Note that, in this case, the elevator control panel(s) and elevator cars assigned to the same group are located adjacent to each other (e.g., elevator cars near the pressed hall button provide service).

According to an operational example, alternate hall buttons result in separate elevator cars 107, 108, 109, 110, 111, 112, 113, and 114 answering the hall call. When a passenger presses any call button of the elevator control panel 121-*a*, the elevator controller 150 receives the hall call from the pressed call button and dispatches one of the elevator cars 107-*a* and 108-*a* to pick up the passenger. When a passenger presses any call button of the elevator control panel 122-*b*, the elevator controller 150 receives the hall call from the pressed call button and dispatches one of the elevator cars 109-*b* and 110-*b* to pick up the passenger. When a passenger presses any call button of the elevator control panels 123-*c* and 124-*c*, the elevator controller 150 receives the hall call from the pressed call button and dispatches one of the elevator cars 111-*c*, 112-*c*, 113-*c*, and 114-*c* to pick up the passenger. Note that alternative elevator and elevator control panel combinations are possible, and these combinations can be automatically assigned by the elevator system 100 according to elevator demand.

Figure 3:
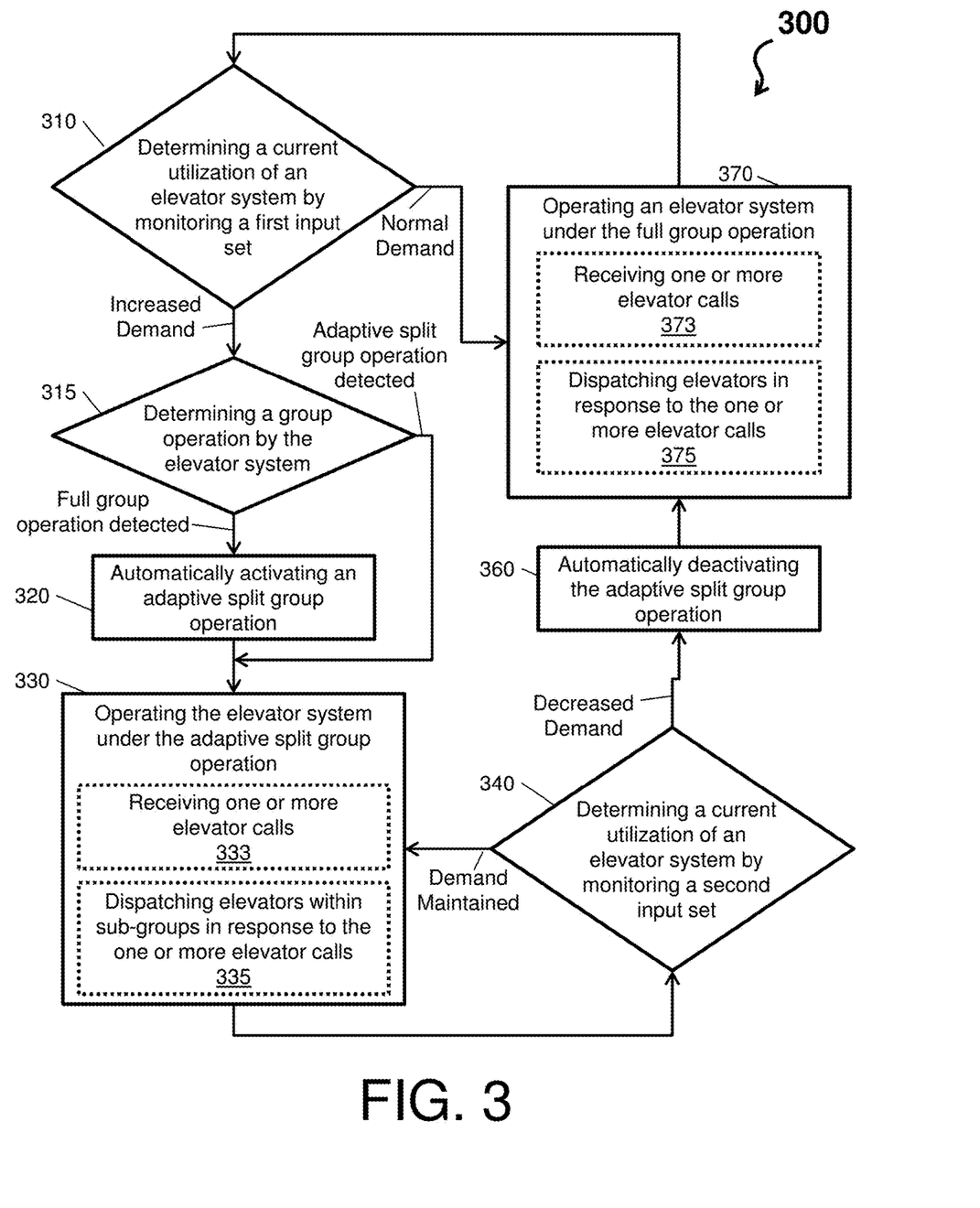
FIG. 3 depicts a process flow of an elevator system in accordance with one or more embodiments.

FIG. 3 depicts a process flow 300 of an elevator system in accordance with one or more embodiments. In general, the elevator system determines service demand based on a current utilization of elevator cars and activates a full group operation or an adaptive split group operation accordingly. Note that the full group operation is a more efficient use of the elevator cars than the adaptive split group operation when the service demand is average or below average (e.g., below a threshold utilization). When service demand is above average (e.g., above a threshold utilization), the adaptive split group operation is a more efficient use of the elevator cars than the full group operation.

The process flow 300 beings at decision block 310, where the elevator system determines a current utilization of an elevator system by monitoring a first input set. The first input set can be information stored within the elevator system or received in real time that details a number of hall calls (e.g., from a same floor), a number of passengers waiting to board the plurality of elevator cars, a number of trips between two or more floors, a load of one or more of the elevator cars per trip, a number of hall calls within a time period, a burst of demand, a schedule for use of a facility (e.g., meeting, concert, show, or presentation). The information of the first input set can be sourced from one or more sensors throughout the elevator system.

Monitoring of the first input set can include a constant evaluation of the current utilization against one or more thresholds (e.g., a threshold utilization). In general, the threshold utilization can be a preset or predetermined benchmark by the elevator system over a time period, such as one day, one week, one month, etc. Information, such as a total number of hall calls, a total number of passengers of the plurality of elevator cars, or an average load of one or more of the plurality of elevator cars per trip, can be sourced from one or more sensors throughout the elevator system to determine the threshold utilization. Further, the information for determining the threshold utilization can include one or more of a number of hall calls (e.g., from a same floor), a number of passengers waiting to board the plurality of elevators, a number of trips between two or more floors, a load of one or more of the elevators per trip, a number of hall calls within a time period, a burst of demand, and a schedule for use of a facility. In accordance with one or more embodiments, if the average number of hall calls per hour over a time period of a month is six hall calls from a tenth floor of a building (e.g., six calls per hour), then the elevator system can set the utilization threshold at one call per 10 minutes.

If the elevator system determines that the current utilization of the elevator system is greater than the threshold utilization of the elevator system, then the process flow 300 proceeds to block 315 (via the Increased Demand Arrow). For example, the elevator system automatically determines that it is experienced high elevator service demand when a successive full loading of elevator cars from the same floor is detected automatically trigger. Continuing with the above example, hall calls are accumulated over a period of ten minutes. If the number of hall call accumulated is greater than one call per 10 minutes, then the process flow 300 proceeds to block 315.

At decision block 315, where the elevator system determines a group operation by the elevator system (this is a self-check by the elevator system). If the elevator system detects the execution of the full group operation, the process flow 300 proceeds to block 320. At block 320, the elevator system automatically activates the adaptive split group operation and proceeds to block 330. During the activation of the adaptive split group operation, the elevator system can assign the elevator cars to one or more groups (e.g., as show in the facility 101.1 of FIG. 1) on a per-hall button floor basis. In accordance with one or more embodiments, the adaptive split group operation can be selective based upon each floor and a current usage level (e.g., determining a high traffic floor of a plurality of floors based on the current utilization of the elevator system for the high traffic floor being greater than the threshold utilization). That is, the adaptive split group operation provides functionality on a per floor basis, where some floors can be serviced with a full group operation, while high traffic floors are serviced using the adaptive split group operations. In accordance with one or more embodiments, the elevator system can also assign specific destination for each of the one or more elevator groups. For instance, one group can be assigned to only travel between two floors, while another group services a remainder of a facility. Returning to decision block 315, if the elevator system detects the execution of the adaptive split group operation, the process flow 300 proceeds directly to block 330.

At block 330, the elevator system operates under the adaptive split group operation. For example, at dotted-block 333, one or more elevator calls are received by the elevator system. Each of these one or more calls is pre-assigned a group based on which elevator control panel sent the call and what group that elevator control panel was assigned. Next, at dotted block 335, the elevator system dispatches elevator cars corresponding to the pre-assigned groups to answer those one or more elevator calls based on their origin 335.

The process flow 300 then proceeds to block 340, where the elevator system determines a current utilization of an elevator system by monitoring a second input set. The second input set can be information received in real time since the first input set was received. The information of the second input set can be sourced from one or more sensors throughout the elevator system. Monitoring of the second input set can include a continued evaluation of the current utilization against one or more thresholds (e.g., a threshold utilization).

If the elevator system determines that the current utilization of the elevator system has remained above the threshold utilization of the elevator system, then the process flow 300 returns to block 330 (via the Demand Maintained Arrow). For example, the elevator system automatically determines that the high elevator service demand is still present.

If the elevator system determines that the current utilization of the elevator system has decreased to below the threshold utilization of the elevator system, then the process flow 300 proceeds to block 360 (via the Decreased Demand Arrow). For example, the elevator system automatically determines that the high elevator service demand is no longer present.

At block 360, the elevator system automatically deactivates the adaptive split group operation and proceeds to block 370. During the activation of the adaptive split group operation, the elevator system can remove group designations (e.g., and return to the facility 101.0 of FIG. 1).

At block 370, the elevator system operates under the full group operation. For example, at dotted-block 373, one or more elevator calls are received by the elevator system. Each of these one or more calls is treated as a normal call. Next, at dotted block 375, the elevator system dispatches elevator cars corresponding to answer those one or more elevator calls. The process flow 300, next, proceeds from block 370 to decision block 310.

Returning to decision block 310, if the elevator system determines that the current utilization of the elevator system is less than or equal to the threshold utilization of the elevator system, then the process flow 300 proceeds to block 370 (via the Normal Demand Arrow).

Technical effects and benefits of embodiments herein can include utilizing elevator cars efficiently when there is light or moderate levels of traffic; eliminating duplicate elevator requests during light traffic; minimizing waiting times during light period; elevator answering requests can be closer to individual locations (elevator cars are closer to when you press the button); and minimizing elevator resources without requiring a facility staff member to activate or deactivate (automation removes staff member from being involved).

Embodiments herein can include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system of a facility with multiple floors, the elevator system comprising:
   a plurality of elevator cars; and
   an elevator controller comprising a memory and a processor, the memory storing computer program instructions executable by the processor to cause the elevator system to:
   determine a current utilization of the elevator system,
   automatically activate an adaptive split group operation on a per floor basis when the current utilization of the elevator system is greater than a threshold utilization of the elevator system, and
   dispatch the plurality of elevator cars under the adaptive split group operation in accordance with one or more elevator calls;
   wherein one or more sensors associated with the elevator system automatically provide an input set utilized to determine the current utilization or the threshold utilization;
   wherein activating the adaptive split group operation occurs automatically in response to the input set from the one or more sensors.

2. The elevator system of claim 1, wherein the elevator system assigns each of plurality of elevator cars to two or more groups in response to the automatic activation of the adaptive split group operation.

3. The elevator system of claim 1, wherein the adaptive split group operation being activated on the per floor basis comprises:
   determining a high traffic floor of a plurality of floors based on the current utilization of the elevator system for the high traffic floor being greater than the threshold utilization while maintaining a remaining set of the plurality of floors under a full group operation.

4. The elevator system of claim 1, wherein the elevator system automatically deactivates the adaptive split group operation when the current utilization of the elevator system is equal to or less than the threshold utilization of the elevator system.

5. The elevator system of claim 1, wherein the current utilization of the elevator system is determined by the elevator controller based on a number of hall calls from a same floor of the multiple floors, a number of passengers waiting to board the plurality of elevator cars, a number of trips between two floors of the multiple floors, or a load of one or more of the plurality of elevator cars per trip.

6. The elevator system of claim 1, wherein the threshold utilization of the elevator system is determined by the elevator controller over a time period based on a total number of hall calls, a total number of passengers of the plurality of elevator cars, or an average load of one or more of the plurality of elevator cars per trip.

7. The elevator system of claim 1, wherein the elevator system comprises a plurality of elevator control panels,
   wherein at least two of the plurality of elevator control panels are located on each of the multiple floors.

8. The elevator system of claim 7, wherein, the at least two elevator panels are split into at least two groups that correspond to at least two groups of the plurality of elevator cars.

9. The elevator system of claim 1, wherein the plurality of elevator cars are split into at least two groups upon deactivation of the adaptive split group operation.

10. A computer-implemented method executable by an elevator controller for operating a plurality of elevator cars of an elevator system of a facility with multiple floors, the computer-implemented method comprising:
    determining a current utilization of the elevator system, automatically activating an adaptive split group operation on a per floor basis when the current utilization of the elevator system is greater than a threshold utilization of the elevator system, and dispatching the plurality of elevator cars under the adaptive split group operation in accordance with one or more elevator calls;

wherein one or more sensors associated with the elevator system automatically provide an input set utilized to determine the current utilization or the threshold utilization;

wherein activating the adaptive split group operation occurs automatically in response to the input set from the one or more sensors.

11. The computer implemented method of claim 10, wherein the elevator system assigns each of plurality of elevator cars to two or more groups in response to the automatic activation of the adaptive split group operation.

12. The computer implemented method of claim 10, wherein the adaptive split group operation being activated on the per floor basis comprises:

determining a high traffic floor of a plurality of floors based on the current utilization of the elevator system for the high traffic floor being greater than the threshold utilization while maintaining a remaining set of the plurality of floors under a full group operation.

13. The computer implemented method of claim 10, wherein the elevator system automatically deactivates the adaptive split group operation when the current utilization of the elevator system is equal to or less than the threshold utilization of the elevator system.

14. The computer implemented method of claim 10, wherein the current utilization of the elevator system is determined by the elevator controller based on a number of hall calls from a same floor of the multiple floors, a number of passengers waiting to board the plurality of elevator cars, a number of trips between two floors of the multiple floors, or a load of one or more of the plurality of elevator cars per trip.

15. The computer implemented method of claim 10, wherein the threshold utilization of the elevator system is determined by the elevator controller over a time period based on a total number of hall calls, a total number of passengers of the plurality of elevator cars, or an average load of one or more of the plurality of elevator cars per trip.

16. The computer implemented method of claim 10, wherein the elevator system comprises a plurality of elevator control panels, wherein at least two of the plurality of elevator control panels are located on each of the multiple floors.

17. The computer implemented method of claim 16, wherein, the at least two elevator panels are split into at least two groups that correspond to at least two groups of the plurality of elevator cars.

18. The computer implemented method of claim 10, wherein the plurality of elevator cars are split into at least two groups upon deactivation of the adaptive split group operation.

* * * * *